(12) United States Patent
Herndon et al.

(10) Patent No.: US 6,378,550 B1
(45) Date of Patent: Apr. 30, 2002

(54) BALL VALVE EXTRACTOR

(75) Inventors: Charles Herndon, Walterboro; Roger A. Brown, North Augusta, both of SC (US)

(73) Assignee: Westinghouse Savannah River Company, LLC, Aiken, SC (US)

( * ) Notice: Subject to any disclaimer, the term of this patent is extended or adjusted under 35 U.S.C. 154(b) by 0 days.

(21) Appl. No.: 09/689,961

(22) Filed: Oct. 12, 2000

(51) Int. Cl.[7] .......................... F16K 43/00; B23P 19/04
(52) U.S. Cl. ................. 137/315.41; 29/221.6; 29/254; 29/275; 81/463; 137/15.22; 137/315.18; 173/91
(58) Field of Search .................. 29/213.1, 221.6, 29/254, 255, 270, 275; 81/27, 176.1, 176.15, 461, 463; 137/15.17, 15.18, 15.22, 315.18, 315.41; 173/90, 91

(56) References Cited

U.S. PATENT DOCUMENTS

| | | | | |
|---|---|---|---|---|
| 1,627,477 A | * | 5/1927 | Blume et al. | 29/254 |
| 1,776,194 A | * | 9/1930 | Leftwich | 29/255 |
| 1,958,329 A | * | 8/1934 | Beard | 29/254 |
| 2,339,258 A | * | 1/1944 | Engh | 29/255 |
| 2,649,825 A | * | 8/1953 | Fisher | 29/213.1 |
| 2,779,089 A | * | 1/1957 | Allen | 29/254 |
| 2,791,926 A | * | 5/1957 | Guyton | 72/457 |
| 3,233,317 A | * | 2/1966 | Moskovitz | 29/275 |
| 3,305,919 A | * | 2/1967 | Pierce | 29/213.1 |
| 3,334,405 A | * | 8/1967 | Cann et al. | 29/213.1 |
| 3,364,554 A | * | 1/1968 | Mueller et al. | 29/213.1 |
| 4,034,594 A | * | 7/1977 | Morgan | 72/457 |
| 4,175,577 A | * | 11/1979 | Kacel et al. | 137/15.22 |
| 4,217,923 A | * | 8/1980 | Kindersley | 251/174 |
| 4,641,681 A | * | 2/1987 | Ikematsu et al. | 137/315.41 |
| 4,667,926 A | * | 5/1987 | Takeda et al. | 251/170 |
| 4,675,968 A | * | 6/1987 | Barlett | 29/254 |
| 5,109,739 A | * | 5/1992 | Hull et al. | 81/463 |
| 5,253,405 A | * | 10/1993 | Carroll | 29/213.1 |
| 5,638,590 A | * | 6/1997 | Silano | 29/254 |
| 5,669,404 A | * | 9/1997 | Guillermo | 29/221.6 |
| 5,915,741 A | * | 6/1999 | Parker | 29/221.6 |
| 5,975,104 A | * | 11/1999 | Willkins | 29/221.6 |
| 5,979,873 A | * | 11/1999 | Wu | 251/315.16 |
| 6,109,292 A | * | 8/2000 | Fox | 137/296 |

* cited by examiner

Primary Examiner—George L. Walton
(74) Attorney, Agent, or Firm—Dority & Manning, PA

(57) ABSTRACT

An apparatus and process for removing a ball valve is provided. The ball valve removal tool provides a handle sliding along the length of a shaft. One end of the shaft is secured within an interior cavity of a ball valve while the opposite end of the shaft defines a stop member. By providing a manual sliding force to the handle, the handle impacts the stop member and transmits the force to the ball valve. The direction of the force is along the shaft of the removal tool and disengages the ball valve from the ball valve housing.

15 Claims, 3 Drawing Sheets

BALL VALVE EXTRACTOR

STATEMENT AS TO RIGHTS TO INVENTIONS MADE UNDER FEDERALLY SPONSORED RESEARCH AND DEVELOPMENT

The U.S. Government has rights in this invention pursuant to Contract No. DE-AC09-96SR18500 between Westinghouse Savannah River Company and the U.S. Department of Energy.

FIELD OF THE INVENTION

This invention is directed towards an impact tool useful in extracting ball valves from a ball-valve housing.

BACKGROUND OF THE INVENTION

Ball valves are extensively used in industry to control and regulate the flow of fluid materials through pipelines and similar conduits. The ball valves are dimensioned according to the pipeline and may, therefore, vary enormously in size. Commonly used ball valves have an inner flow diameter openings which range from 1" and may exceed 12" depending upon the conduit size. A typical ball valve is seated within a housing and is secured opposite conduit openings by a pair of opposing rubber or silicone gaskets held in place by gasket holders. The ball valve is designed to rotate within the holder at least 90° and thereby provide a means of regulating flow through a pipeline or conduit.

A ball valve is designed to fit within a housing and has tight dimensional tolerances so as to provide a secure, leak-proof seal. As a result, when repair or maintenance is required on the ball valve structure, the removal of the valve from the housing is a labor intensive endeavor. Heretofore, removal of a ball valve often required a specialized clamp-on tool as seen in U.S. Pat. No. 4,175,577, incorporated herein by reference, or as set forth in U.S. Pat. No. 5,975,104 to Wilkins et al also incorporated herein by reference. The specialty tools referenced above require additional set up time.

A common removal technique also involves the use of pliers or a bar to pry the ball valve loose. However, prying and loosening of a ball valve using conventional hand tools may take as long as 40 to 45 minutes for removal. Further, the removal frequently damages the ball valve surface. Once damaged, the ball valve surface will degrade the integrity of the ball valve seals each time the surfaces make contact. As a result, more frequent repair and replacement of ball valve seals is required which necessitates additional ball valve removals and hence additional damage to the ball valve. Accordingly, there remains a need for improvement within the art of ball valve removal.

SUMMARY OF THE INVENTION

One aspect of the present invention is to provide an apparatus and a process for the removal of ball valves. In particular, it is an object of the invention to provide an apparatus and a process which facilitates the rapid removal of a ball valve and does so in a manner which avoids damage to any of the ball valve surfaces or associated seals.

Another aspect of this invention is to provide a ball valve removal tool which has a set of interchangeable tips to facilitate the use of the removal tool with a variety of different sized ball valves.

One embodiment of an apparatus for carrying out the ball removal process is provided by a ball valve removal tool comprising a shaft having a first end, a second end, and defining an axial length therebetween. The first end of the shaft defines a tip adapted for engaging the stem hole of a ball valve joint and a second end of the shaft defines a stop member. The removal tool further defines a handle, the handle operatively engaging in a rotatable and slideable manner the axial length of the shaft along an opening defined along the length of the handle. The tool may be used by inserting the first tip end of the shaft into the stem hole and securing the tip within the ball valve. Therefore, the handle is used to sharply impact the stop member, thereby delivering a force to the ball valve in the direction along the axis of the shaft. The force displaces the ball valve from the ball valve housing.

The above apparatus is useful in a method of removing a ball valve, a method of removal comprising providing a shaft having a first end and a second end, the first end defining a tip, the tip defining a pair of opposite edges, each edge extending beyond a surface plane of the shaft;

inserting the shaft tip into a stem hole of a ball valve;

rotating the shaft and thereby placing the tip engaging walls in an engaged position within the ball valve;

impacting a stop member carried on a second end of a shaft by sliding the handle from a first position in proximity to the shaft tip end to a second position which impacts the stop member, thereby releasing the ball valve from the ball valve housing.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus or process pathway. To avoid redundancy, detailed descriptions of much of the apparatus once described in relation to a figure is not repeated in the descriptions of subsequent figures, although such apparatus or process is labeled with the same reference numbers.

Figure 1:
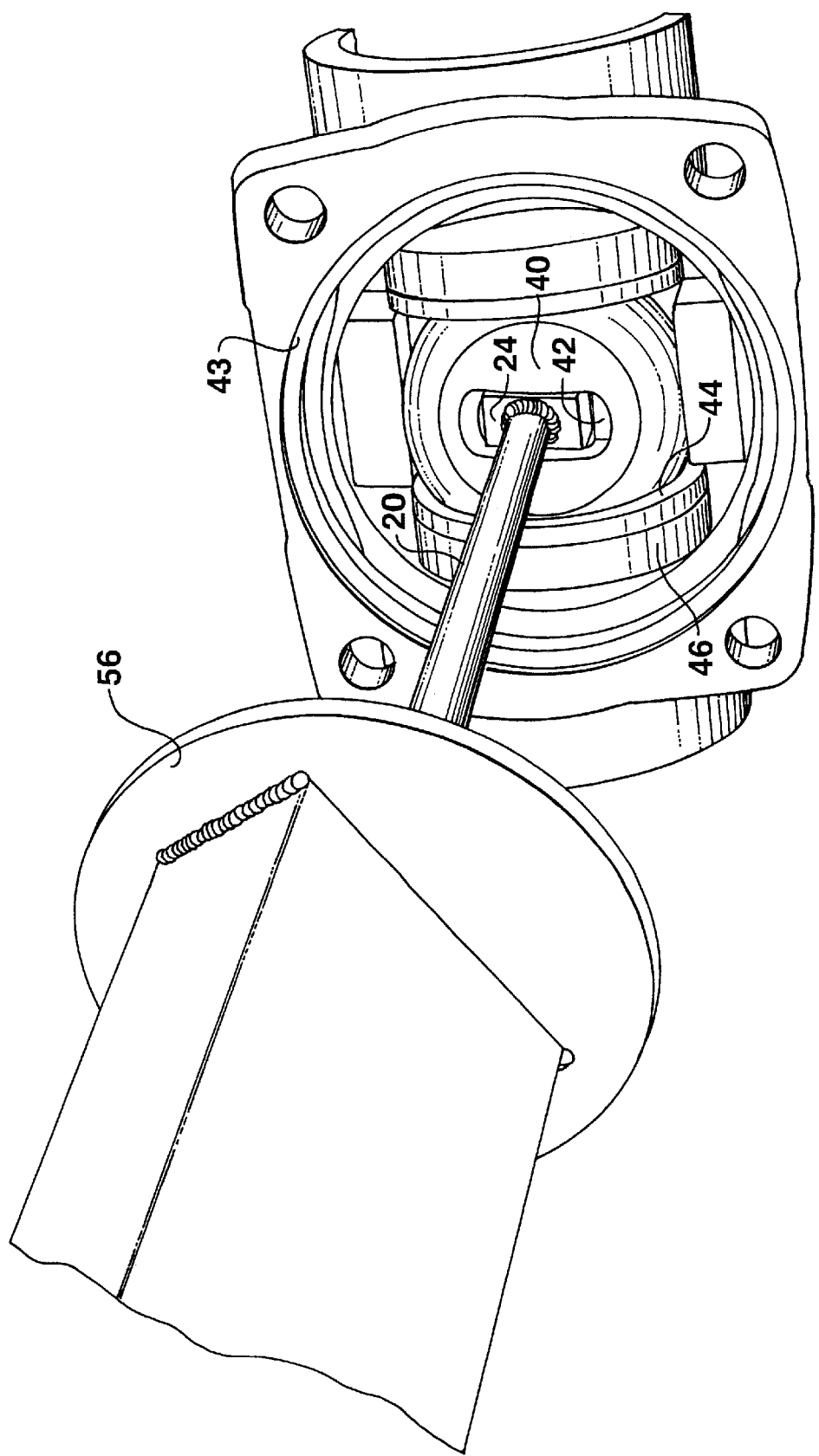
FIG. 1 is a perspective view of a ball-valve secured within a ball valve housing having the removal tool inserted into the stem hole.
Figure 2:
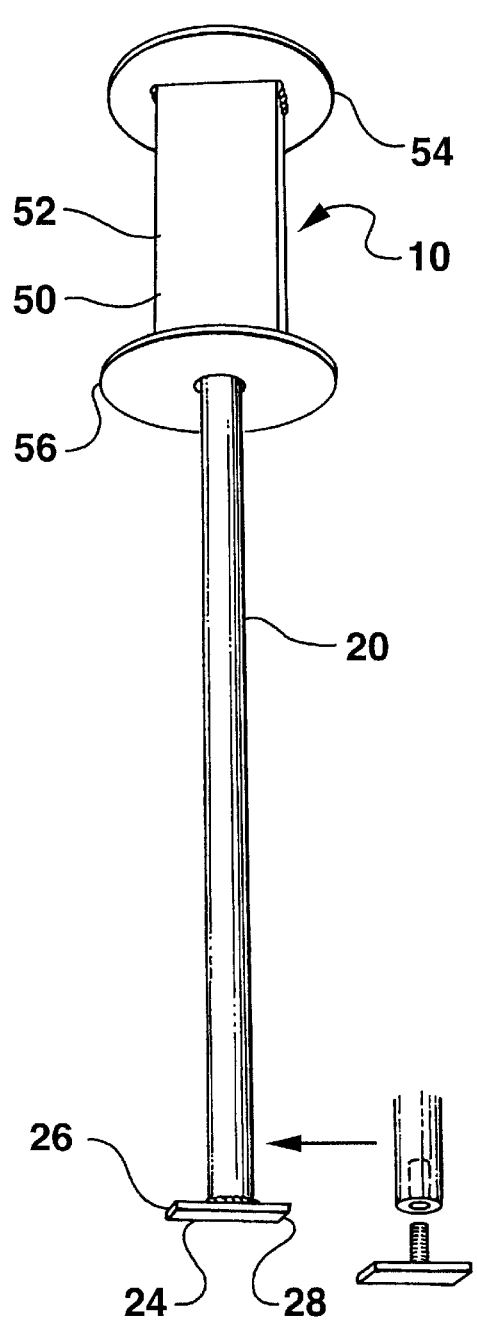
FIG. 2 is a perspective view of a ball valve extractor apparatus in accordance with this present invention.
Figure 3:
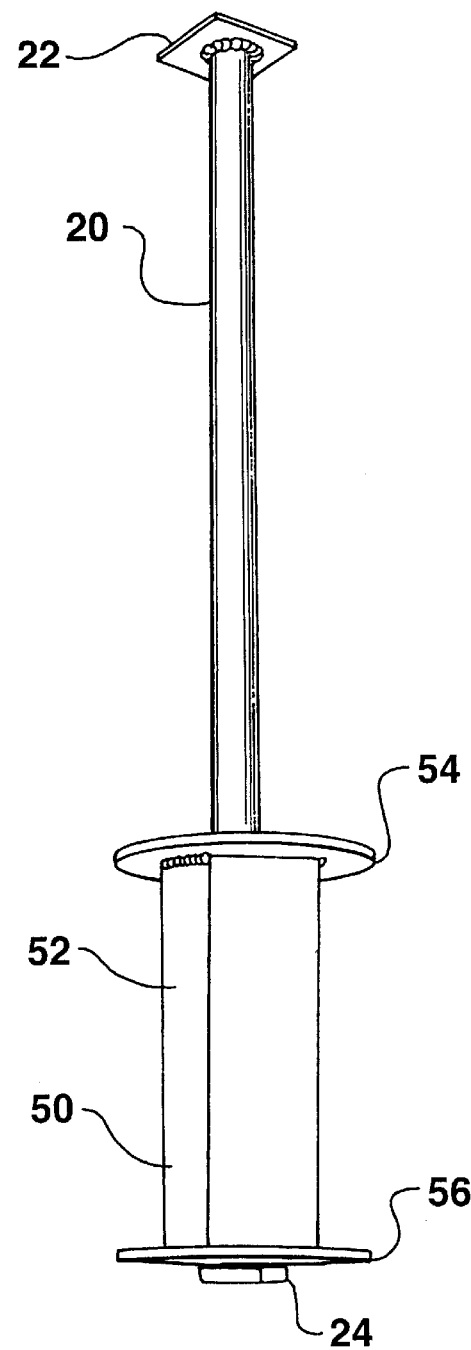
FIGS. 3 and 4 are additional perspective views of the apparatus seen in FIG. 2 showing the sliding handle in an alternative positions along the tool shaft.
Figure 4:
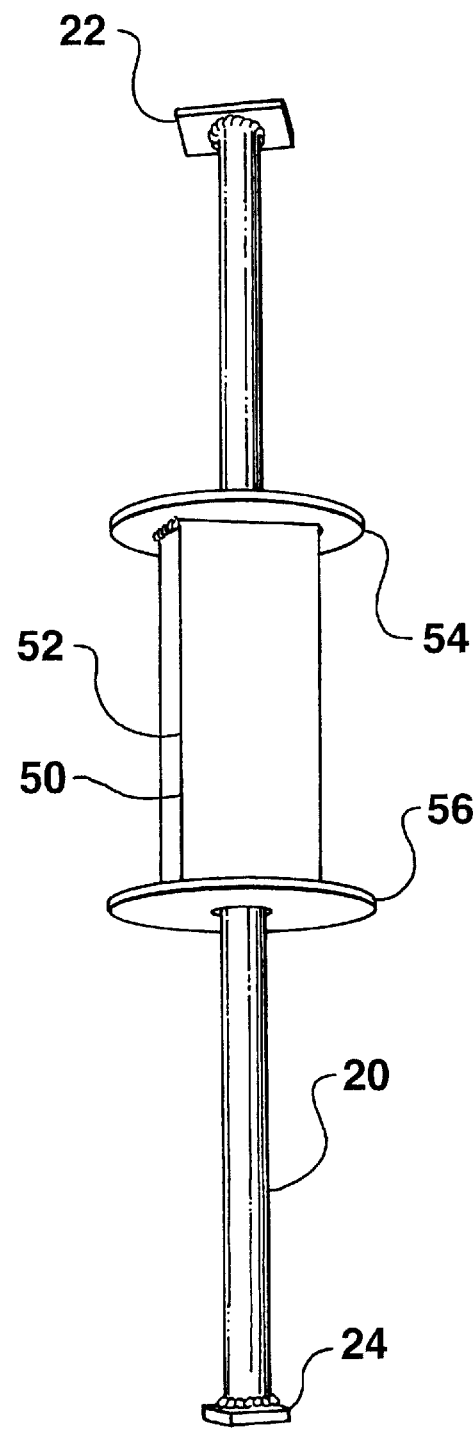

As best seen in FIG. 1, a conventional ball valve 40 defines curved outer walls. The ball valve 40 is operatively seated between a pair of opposing gaskets 44, each gasket 44 being maintained in position by a respective gasket holder 46 and positioned within a ball valve housing 43.

In normal use, ball valve 40 is rotated by an actuator (not illustrated) which engages stem hole 42 and thereby providing a mechanism for rotating the ball valve 40 from an open position to a closed position.

As seen in reference to FIGS. 1–4, a ball valve removal apparatus 10 is provided having a cylindrical shaft 20 made from a durable, rigid material such as stainless steel. A first end of shaft 20 defines a stop member 22. Stop member 22 is illustrated as a rectangular plate welded to the distal end of shaft 20. However, stop member 22 may assume a variety of shapes.

A second end of shaft 20 defines a tip 24. Tip 24 is configured so as to be received within a stem hole 42 of a ball valve 40. One form of a configured tip 24 provides for a tip having at least one pair of opposite edge walls 26 and 28 which extend beyond a surface plane of shaft 20. As illustrated, all walls of the rectangular tip 24 may extend beyond a surface plane of the shaft 20. Preferably, tip 24 has a length greater than the width of the stem hole 42.

Tip 24 is inserted into stem hole 42 a sufficient depth so as to allow rotation of the tip 24 within a central cavity defined within the ball valve. Preferably, the shaft 20 is rotated about 90° so as to place the tip edges 26 and 28 in a locked position within the ball valve and which prevents the withdrawal of the apparatus 10 from the ball valve.

Ball valve removal apparatus 10 further defines a handle 50. Handle 50 defines an aperture along its axis and through which the handle is attached to shaft 20 in a freely slideable and rotatable manner. This arrangement permits the handle to be positioned anywhere along the respective length of shaft 20. Handle 50 further defines an engagement region 52 which is adapted for grasping by a user. The engagement region 52 may have any conventional material coating or ergonomic shape designed to facilitate the grasping and movement of the handle.

An upper handle terminus 54 is seen in the form of an enlarged diameter circular plate and is adapted for direct engagement with stop member 22. In addition to the striking function described below, the upper handle terminus 54 provides a protective shield for the operator's hand when the handle is being reciprocated. A similar lower handle terminus 56 is provided and which serves a similar protective function. As illustrated in the figures, stop member 22 and tip 24 additionally serve as retaining members for maintaining the handle 50 on shaft 20.

Upon securement of tip 24 within the stem hole 42, handle terminus 54 is used to strike the stop member 22, thereby providing a hammer-like blow to the ball valve. The force of the impact is directed upwardly in the axial direction of shaft 20. It has been found that in accordance with this invention that a single operator may easily disengage a ball valve from the ball valve housing and gaskets by the striking of handle 50 to stop member 22. The actual time required to remove the ball valve takes just a matter of seconds from the time the tool is inserted into the stem hole until the time a blow from handle 50 to stop member 22 operates to free the ball valve 40 from the ball valve housing.

It is envisioned that a single ball valve removal apparatus may be used to engage a variety of different sized ball valves by providing interchangeable tips 24 of various sizes. Tips 24 may be attached to the respective end of shaft 20 by a number of conventional means such as a mated, threaded engagement. Further, while a majority of ball valves have, as depicted, a rectangular stem hole opening defined in the top of the ball valve, the present invention envisions tip 24 being configured to mate with any alternative shaped stem holes which may be present within a ball valve. Irrespective of the stem hole shape, tip 24 may be designed to be inserted into the opening. Upon rotation of shaft 20, the tip 24 is thereafter secured within the ball valve.

It has been found useful to provide handle 50 with a sufficient mass such that a strong, forceful impact is provided to stop member 22. If handle 50 is too light weight, a force sufficient to loosen the ball valve is not provided. Handle 50 preferably has a length greater than its width, the handle further defining an aperture through its length and through which handle 50 may slide and rotate relative to shaft 20.

Ball valves are used in many industrial processes and work environments. Oftentimes, the industrial process results in a residue which forms on the ball valve assembly components which may render conventional removal of the ball valve more difficult. For instance, a gummy fluid or high concentrations of brine solutions will often coat the ball valve and associated seals in a way that requires greater force to remove the ball valve. It has been found that the apparatus and process of the present invention provides an effective tool and method for the removal of such coated ball valves.

One advantage of the ball valve removal tool is that no damage results to the outer ball valve surfaces. Accordingly, the sealing surface of the ball valve maintains a smooth condition and thereby minimizes wear and tear on the associated gaskets. Removal efforts which contacted the outer surface of the ball valve tended to scar the ball valve surface. Accordingly, subsequent use of the surface-damaged ball valve brought about a more rapid degradation of the sealing gaskets where the damaged ball valve surface made contact with the seals.

The present ball valve removal apparatus and process allows for a rapid removal of the ball valve without damage to the component parts. As a result, repair and replacement of ball valves may be brought about more efficiently. Further, future maintenance of the ball valve assembly seals is lessened by avoiding damage to the exterior surface of the ball valve.

While the drawings are in reference to a ball valve which is being removed in a vertical direction, it is understood and appreciated by those having ordinary skill in the art that a ball valve may be oriented in a variety of locations. The present ball valve removal tool is operative in any such position or angle and requires only sufficient clearance for the ball valve tool to be inserted and the handle to be sharply impacted against the terminal stop member.

In addition, the enlarged upper and lower ends as seen as circular plates on handle 50 may be used to receive a blow from a hammer or other similar tool if there is insufficient clearance to operate the handle as described above. In other words, by placing the upper handle end 54 adjacent to the stop member 22, a blow directed along a lower surface of the handle 50 will provide a similar impact force in a direction along the axis of shaft 20. In this manner, the engaged ball valve may be removed.

Further, it is also envisioned that the removal tool of the present invention may be provided in any size needed to remove a ball valve. In the case of extremely large industrial valves or for valves positioned in locations or work environments where worker access is limited, the handle may be moved remotely by attachment of a cable to the handle. If desired, an aperture or securing means may be defined within the handle 50 to allow the handle 50 to be operated remotely. A remote operation may include manually engaging the cable so as to provide the impact between the handle 50 and the stop member 22. In addition, a rapid engagement of the handle via an interconnected motor, hydraulically controlled arm, or other actuator may be used.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. A ball valve removal tool comprising:
   a cylindrical shaft having a first end, a second end, and an axial length therebetween, the first end of the shaft defining a tip adapted for engaging the stem hole of a ball valve and a second end of the shaft defining a stop member;
   a handle, the handle operatively engaging the axial length of the shaft along an opening defined by a length of the handle;
   wherein, when the first end of the shaft is inserted through a ball valve housing and into the stem hole, the shaft is rotated 90°, thereby securing the tip within the ball valve stem hole, and the handle may be used to impact the stop member, thereby delivering a force along the direction of the shaft axis which is used to disengage and remove a ball valve from a ball valve housing for servicing the ball valve while avoiding damage to the ball valve components.

2. The apparatus according to claim 1 wherein the tip is removable from the first end of the shaft.

3. The apparatus according to claim 1 wherein the first end of the shaft is adapted for mated engagement of different sized tips, said tips facilitating the engagement and removal of different sized ball valves.

4. The removal tool according to claim 1 wherein the handle has a length greater than its width.

5. The removal tool according to claim 1 wherein the handle further defines a first end and a second end, the first and second handle ends each defining a terminus having a cross sectional area greater than a cross section area of a midsegment of the handle.

6. The removal tool according to claim 5 wherein at least one of the first and second handle ends is circular.

7. The removal tool according to claim 1 wherein the tip defined by a first end of the shaft further defines a tip width which is greater than a diameter of the shaft.

8. The removal tool according to claim 1 wherein the tip defined on a first end of the shaft has a height in a direction parallel to an axis of the shaft, the tip further defining a width and a length, both the width and the length being greater than the diameter of the shaft.

9. A method of removing a ball valve from a ball valve housing while avoiding damage to the ball valve components comprising:
   providing a shaft having a first end and a second end, the first end having a terminal tip;
   inserting the terminal tip through a ball valve housing and into a stem hole of a ball valve, the tip defining at least one pair of opposite edge walls extending beyond a surface plane of the shaft;
   rotating the shaft approximately 90° and thereby placing the tip edge walls in an engaged position within an interior of the ball valve stem hole;
   impacting a stop member carried on a second end of the shaft with a handle, the handle sliding along the shaft from a first position in proximity to the first shaft end to a second position impacting the stop member, thereby releasing the ball valve from the ball valve housing.

10. The method according to claim 9 comprising the additional step of removing the shaft and the terminal tip from the stem hole of the ball valve by rotating the shaft 90° from the engaged position; and
   withdrawing the shaft and terminal tip from the stem hole.

11. A ball valve removal tool comprising:
   cylindrical shaft having a first end, a second end, and an axial length therebetween, the first end of the shaft defining a tip having a width and a length greater than a diameter of the shaft, the tip adapted for engaging an interior of a ball valve and said shaft further defining a stop member;
   a handle, the handle operatively engaging the axial length of the shaft between the first shaft end and the stop member;
   wherein, when the first end of the shaft is inserted through a ball valve housing and into the interior of a ball valve, the shaft is rotated and thereby securing the tip within the interior of a ball valve stem hole, and the handle may be used to impact the stop member, thereby delivering a force along the direction of the shaft axis which is used to disengage and remove a ball valve from a ball valve housing without damaging the ball valve components.

12. The apparatus according to claim 11 wherein the tip is removable from the first end of the shaft.

13. The apparatus according to claim 11 wherein the first end of the shaft is adapted for mated engagement of different sized tips, said tips facilitating the engagement and removal of different sized ball valves.

14. The removal tool according to claim 11 wherein the handle further defines a first end and a second end, the first and second handle ends each defining a terminus having a cross sectional area greater than a cross section area of a midsegment of the handle.

15. The removal tool according to claim 14 wherein at least one of the first and second handle ends is circular.

* * * * *